United States Patent [19]

Hancock

[11] 4,337,331

[45] Jun. 29, 1982

[54] CONDUCTIVE POLYMERS, FIBERS MADE THEREFROM AND PROCESS FOR MANUFACTURE

[75] Inventor: Roger I. Hancock, Stockton-on-Tees, England

[73] Assignee: Imperial Chemical Industries Limited, London, England

[21] Appl. No.: 226,773

[22] Filed: Jan. 21, 1981

[30] Foreign Application Priority Data

Jan. 31, 1980 [GB] United Kingdom ............... 8003231

[51] Int. Cl.$^3$ .................. C08L 77/06; C08L 61/14
[52] U.S. Cl. ............................. 525/429; 57/362; 264/176 F; 428/364; 525/442
[58] Field of Search ............... 525/429, 442, 507; 264/176 F; 428/364; 57/362

[56] References Cited

U.S. PATENT DOCUMENTS

| | | | |
|---|---|---|---|
| 2,378,667 | 6/1945 | Vaala | 525/429 |
| 2,973,340 | 2/1961 | Case | 525/507 |
| 3,108,087 | 10/1963 | Kirkpatrick et al. | 525/507 |
| 4,110,277 | 8/1978 | Economy et al. | 525/429 |

FOREIGN PATENT DOCUMENTS

963320 10/1962 United Kingdom.
990713 4/1963 United Kingdom.

*Primary Examiner*—Theodore E. Pertilla
*Attorney, Agent, or Firm*—Cushman, Darby & Cushman

[57] ABSTRACT

A conductive polymer comprising a fiber-forming synthetic polymer having dispersed therein as a separate phase between 1% and 20% by weight inclusive based on the polymer of a polyalkoxylated phenol-formaldehyde condensate. Conductive fibers may be produced by melt spinning the conductive polymer.

9 Claims, No Drawings

CONDUCTIVE POLYMERS, FIBERS MADE THEREFROM AND PROCESS FOR MANUFACTURE

The present invention relates to conductive fibre-forming synthetic polymers and fibres made therefrom having improved electrical conductive properties.

According to the present invention, there is provided a conductive polymer comprising a fibre-forming synthetic polymer having dispersed therein as a separate phase between 1% and 20% by weight inclusive based on the polymer of a polyalkoxylated phenol-formaldehyde condensate.

According to the present invention, there is further provided a conductive fibre comprising a fibre-forming synthetic polymer having dispersed therein as a separate phase between 1% and 20% by weight inclusive based on the polymer of a polyalkoxylated phenol-formaldehyde condensate.

According to the present invention, there is provided a process for producing a conductive fibre comprising melt spinning a fibre-forming synthetic polymer having dispersed therein as a separate phase between 1% and 20% by weight inclusive based on the polymer of a polyalkoxylated phenol-formaldehyde condensate.

The term fibre as used herein includes continuous filament and staple fibre.

Suitable synthetic polymers for use in the present invention are polyamides such as poly(hexamethylene adipamide) or polycaproamide or polyesters such as poly(ethylene terephthalate).

The polyalkoxylated phenol-formaldehyde condensate may be prepared by condensing a phenol, preferably an alkyl phenol, with formaldehyde or para-formaldehyde to produce a phenol-formaldehyde polymer and subsequently reacting the polymer with ethylene oxide or with a mixture of ethylene oxide and propylene oxide to produce a polyalkoxylated phenol-formaldehyde condensate preferably having the general formula

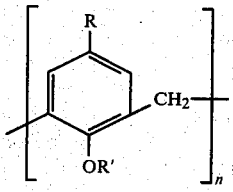

in
which n is an integer between 2 and 19 inclusive, preferably between 3 and 8 inclusive, R is hydrogen or preferably an alkyl group containing 1 to 20 carbon atoms, preferably 4 to 16 carbon atoms, $R_1$ is $+CH_2CH_2O)_mH$, or up to 20% by weight of the $+CH_2CH_2O)_m$ may be replaced by

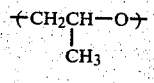

groups either randomly or in blocks, m is an integer such that the polyalkoxylated phenol-formaldehyde condensate contains between 60% and 95% by weight inclusive of alkylene oxide units based on the weight of the polyalkoxylated phenol-formaldehyde condensate.

The phenol-formaldehyde polymer may be reacted with the alkylene oxide using a conventional alkoxylation method, for example at 130° C. to 170° C. in the liquid phase using 1% to 5% by weight of an alkali metal hydroxide as catalyst. It should be understood that where, for example, m is 20, this represents a mean figure and that a mixture of products will be obtained with m values distributed about this mean.

The values given for n are also mean values and a mixture of products will be obtained with n values distributed about this mean.

At least some of the terminal hydroxyl groups on the poly(alkylene oxide) parts of the polyalkoxylated phenol-formaldehyde condensate may be converted to alkoxy, phosphate, sulphate or sulphonate groups by conventional procedures, for example by reaction with sulphur trioxide or chlorsulphonic acid to yield sulphate groups.

Where R is an alkyl group, it may be linear or branched. Where R is a branched alkyl group, the alkyl groups in the poly-alkoxylated alkylphenol-formaldehyde condensate may consist of a mixture of isomeric, branched-chain groups. Examples of suitable alkyl groups are methyl, ethyl, iso-propyl, tertiary-butyl, 1, 1, 3, 3-tetramethylbutyl, propylene tetramer, isobutylene tetramer, and nonyl groups.

The polyalkoxylated phenol-formaldehyde condensate may be incorporated in the fibre-forming polymer at any stage of manufacture. Thus the condensate may be incorporated in the monomer prior to polymerisation or it may be incorporated in the preformed polymer prior to extrusion of fibre.

The polymers and fibres of the present invention may optionally contain other additives such as, for example, antioxidants, stabilisers, delustrants or colouring materials.

The conductive fibres of the present invention are suitable for any fibre end use in which improved electrical conductivity is desirable. The conductive fibres are particularly useful in carpets.

The fibre-forming synthetic polymer of the present invention may be used as a component of a bicomponent fibre. Thus it may be used as a component of a side-by-side bicomponent fibre or as the sheath or core of a sheath-core bicomponent fibre.

The separate dispersed phase in the fibre of the present invention is in the form of small particles elongated in the direction parallel to the longitudinal axis of the fibre. When fibres containing the condensate particles are scoured, or subjected to a similar wet treatment, some of the condensate may be extracted to leave voids which increase the covering power and soil-hiding ability of the fibres.

The following examples, in which all parts and percentages are by weight, illustrate but do not limit the present invention.

EXAMPLE 1

An octylphenol-formaldehyde resin having an average of 4.5 phenol units per resin molecule was made by reacting 4-(1,1,3,3-tetramethylbutyl) phenol with formaldehyde. The resin so produced (60 parts) was dissolved in a solvent (47 parts) comprising a mixture of $C_7$ to $C_9$ alkylbenzenes and the solution was placed in a stirred autoclave together with powdered potassium hydroxide (1.4 parts) as catalyst. The autoclave contents were then heated to a temperature of 140° C. and ethylene oxide (107 parts) was slowly added over a period of 2 hours, the temperature being maintained at approximately 150° C. At the end of the reaction, the product was cooled to 140° C., neutralised with acetic acid, filtered and the solvent was removed by distillation. The polyethoxylated octylphenolformaldehyde condensate so produced contained approximately 64% by weight of ethylene oxide units based on the weight of the condensate, ie an average of 8 to 9 ethylene oxide units per octylphenol unit in the condensate molecule.

Poly(hexamethylene adipamide) containing approximately 5% by weight of the polyethoxylated octylphenol-formaldehyde condensate was prepared by adding the condensate at an early stage in the polymerisation of hexamethylene adipamide salt in an autoclave.

The poly(hexamethylene adipamide) polymer containing the condensate was melt spun at 289° C. to produce a 275 decitex 20 filament spun yarn. The spun yarn was drawn to produce an 82 decitex 20 filament drawn yarn. A fabric was knitted from the drawn yarn, dyed, rinsed thoroughly with water and dried.

A sample of the knitted fabric was conditioned for 24 hours at constant relative humidity. The fabric was placed on a flat, high electrical resistance material and a pair of spaced electrodes were placed on the surface of the fabric. The surface electrical resistance was measured at 10 locations on the fabric. The mean electrical resistance was calculated and was used to calculate the electrical resistivity in ohms per square. The fabric had an electrical resistivity of $1174 \times 10^{10}$, $797 \times 10^{10}$ and $94 \times 10^{10}$ ohms per square after conditioning the fabric at 35%, 43% and 65% relative humidity respectively. In comparison, fabric made from unmodified poly(hexamethylene adipamide) had an electrical resistivity of $2263 \times 10^{10}$, $1693 \times 10^{10}$ and $1473 \times 10^{10}$ ohms per square respectively.

EXAMPLE 2

Example 1 was repeated except that there was used a polyethoxylated octylphenol-formaldehyde condensate containing approximately 80% by weight of ethylene oxide units based on the weight of the condensate, ie an average of 20 ethylene oxide units per octylphenol unit in the condensate molecule. The knitted fabric produced had an electrical resistivity of $532 \times 10^{10}$, $345 \times 10^{10}$ and $31 \times 10^{10}$ ohms per square after conditioning the fabric at 35%, 43% and 65% relative humidity respectively.

EXAMPLE 3

Poly(hexamethylene adipamide) containing approximately 4% of a polyethoxylated octylphenol-formaldehyde condensate was prepared essentially as in Example 1 except that the condensate described in Example 2 was used.

The polyamide polymer containing the condensate was melt spun to produce a 2670 decitex 68 filament spun yarn of trilobal filament cross-section. The spun yarn was consecutively drawn and steam jet textured to produce an 890 decitex 68 filament bulked carpet yarn. The bulked yarn was used to produce a tufted carpet which was then dyed. A conventional non-conductive backing was applied to the carpet. The carpet was tested by the Stroll Test according to DIN 54345 at 25% relative humidity and 23° C. using conductive rubber soles. The charge generated was 720 volts.

A charge of 6660 volts was generated by a similar carpet but made from a bulked yarn comprising unmodified poly(hexamethylene adipamide).

EXAMPLE 4

A drawn yarn was produced as in Example 1 except that there was used a polyethoxylated octylphenol-formaldehyde condensate containing approximately 90% by weight of ethylene oxide units based on the weight of the condensate and the drawn yarn produced had a decitex of 105 and contained 7 filaments. A fabric was knitted from the drawn yarn and was subjected to International Standards Organisation washing test number 4 except that the washing test was for 60 minutes instead of 30 minutes. After rinsing with water, drying and conditioning at 43% relative humidity, the fabric had an electrical resistivity of $130 \times 10^{10}$ ohms per square.

EXAMPLE 5

Example 4 was repeated except that there was used a polyalkoxylated octylphenol-formaldehyde condensate containing approximately 60% by weight of ethylene oxide units and propylene oxide units in the ratio 90 to 105 respectively. After washing and conditioning as in Example 4, the knitted fabric had an electrical resistivity of $760 \times 10^{10}$ ohms per square. In comparison, fabric made from unmodified poly(hexamethylene adipamide) had an electrical resistivity of approximately $11000 \times 10^{10}$ ohms per square.

EXAMPLE 6

Example 4 was repeated except that there was used the polyethoxylated octylphenol-formaldehyde condensate of Example 2 ie the condensate contained an average of 20 ethylene oxide units per octylphenol unit in the condensate molecule. After washing and conditioning as in Example 4, the knitted fabric had an electrical resistivity of $270 \times 10^{10}$ ohms per square.

COMPARATIVE EXAMPLE A

Example 4 was repeated except that there was used a polyethoxylated nonylphenol condensate containing an average of 20 ethylene oxide units per nonylphenol unit. After washing and conditioning as in Example 4, the knitted fabric had an electrical resistivity of $580 \times 10^{10}$ ohms per square. Comparison with Example 6, illustrates that the polyethoxylated alkylphenolformaldehyde condensate is more durable to washing then an equivalent polyethoxylated alkylphenol condensate.

What is claimed is:

1. A conductive polymer comprising a fibre-forming synthetic polymer selected from the group consisting of polyester and polyamide having dispersed therein as a separate phase between 1% and 20% by weight inclusive based on the polymer of a polyalkoxylated phenol-formaldehyde condensate having the general formula

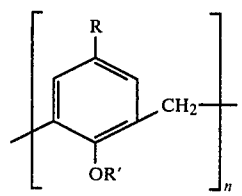

in which n is an integer between 2 and 19 inclusive, R is hydrogen or an alkyl group containing 1 to 20 carbon atoms and R' is $-(CH_2CH_2O)_m H$ in which m is an integer such that the polyalkoxylated phenol-formaldehyde condensate contains between 60% and 95% by weight inclusive of alkylene oxide units based on the weight of the polyalkoxylated phenol-formaldehyde condensate.

2. A conductive polymer according to claim 1 in which up to 20% by weight of the $-(CH_2CH_2O)_m$ in R' is replaced by

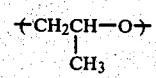

groups.

3. A conductive polymer according to claim 1 or claim 2 in which n is an integer between 3 and 8 inclusive.

4. A conductive polymer according to claims 1, 2 or 3 in which R is an alkyl group containing 4 to 16 carbon atoms.

5. A conductive polymer according to any one of claims 1 and 2 to 4 in which R is a branched alkyl group.

6. A conductive polymer according to any one of claims 1 and 2 to 4 in which at least some of the terminal hydroxyl groups on the poly(alkylene oxide) parts of the polyalkoxylated phenol-formaldehyde condensate have been converted to alkoxy, phosphate, sulphate or sulphonate groups.

7. A conductive fibre comprising a conductive polymer according to any one of claims 1 and 2 to 6.

8. A conductive fibre according to claim 7 in which said fibre contains voids.

9. A process for producing a conductive fibre comprising melt spinning a conductive polymer according to any one of claims 1 and 2 to 6.

* * * * *